United States Patent [19]

Kessoku

[11] Patent Number: 5,220,520
[45] Date of Patent: Jun. 15, 1993

[54] COMPACT PORTABLE ELECTRONIC APPARATUS CAPABLE OF STORING DATA WHEN A POWER SUPPLY IS REMOVED

[75] Inventor: Hirobumi Kessoku, Yokohama, Japan

[73] Assignee: Kabushiki Kaisha Toshiba, Kawasaki, Japan

[21] Appl. No.: 648,048

[22] Filed: Jan. 30, 1991

[30] Foreign Application Priority Data

Jan. 31, 1990 [JP] Japan .................................. 2-21562

[51] Int. Cl.$^5$ .............................................. G06F 1/00
[52] U.S. Cl. ...................................... 364/708; 371/66
[58] Field of Search .................. 364/708, 707; 371/61; 361/392, 399

[56] References Cited

U.S. PATENT DOCUMENTS

| | | | |
|---|---|---|---|
| 4,002,892 | 1/1977 | Zielinski | 364/708 |
| 4,307,455 | 12/1981 | Juhasz et al. | 371/66 X |
| 4,658,352 | 4/1987 | Nagasawa | 377/66 X |
| 4,763,333 | 8/1988 | Byrd | 377/66 |
| 5,021,983 | 6/1991 | Nguyen et al. | 364/707 |

FOREIGN PATENT DOCUMENTS 2907660 8/1979 Fed. Rep. of Germany .

Primary Examiner—Tan V. Mai
Attorney, Agent, or Firm—Cushman, Darby & Cushman

[57] ABSTRACT

A portable terminal includes a main body having a mounting portion. A processing section for processing information is arranged in the main body and has a memory for storing information. A battery is removably mounted in the mounting portion and releasably locked at a predetermined loaded position in the mounting portion. The battery is electrically connected to the processing section through connecting members. When the battery is removed from the mounting portion, the start of operation for the removal is detected by a detecting switch. During the time interval between the start of the removal operation and the point of time when the electrical connection by the connecting members is cut off, the in-process data is entered into the memory by an entering section, in response to a detection result from the detecting switch.

16 Claims, 5 Drawing Sheets

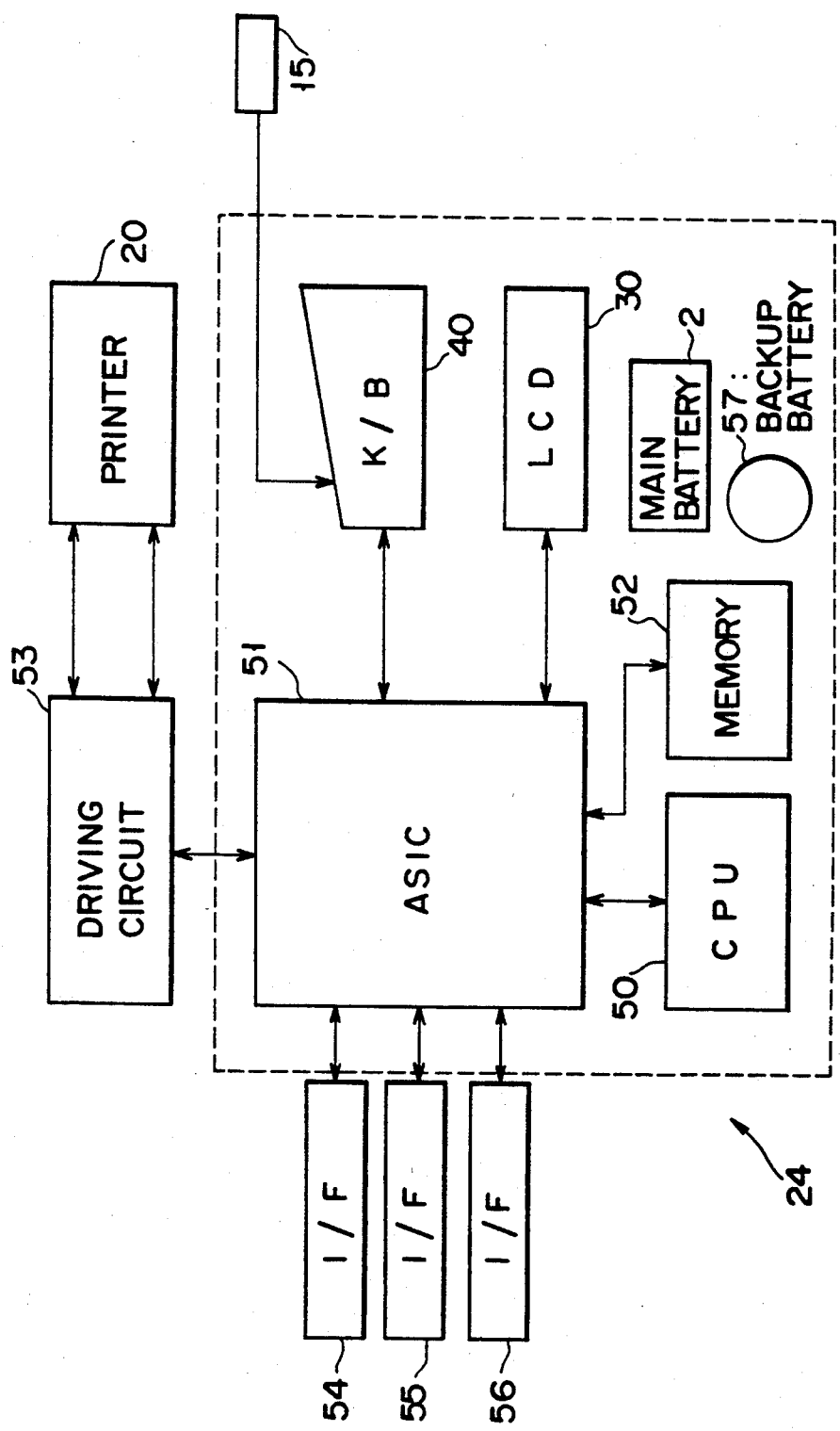
F I G. 4

COMPACT PORTABLE ELECTRONIC APPARATUS CAPABLE OF STORING DATA WHEN A POWER SUPPLY IS REMOVED

BACKGROUND OF THE INVENTION

1. Field of the Invention

The present invention relates to a compact portable electronic apparatus such as a portable terminal

2. Description of the Related Art

Recently, compact portable terminals have been developed which use a removable battery pack as a drive source. These portable terminals enable the instantaneous collection and processing of various information in the fields of distribution, finance, insurance, transportation etc., for example.

The portable terminals of this type are designed so that the battery pack mounted therein cannot be carelessly removed. More specifically, the battery pack has an engaging portion which is adapted to be engaged with a lock arm on a main body of the terminal so that the battery pack can be held in position when it is set in the terminal body. The battery pack can be removed by being drawn out from the terminal body with the lock arm thereon disengaged from the engaging portion of the battery pack.

In the conventional portable terminals, however, the battery pack can be removed without regard to the operating state. Possibly, therefore, the battery pack may be removed by mistake when the power is on or during operation, or the power may be turned on while the battery pack is being removed. In such a case, the power supply will be instantaneously cut off, so that in-process data or problem data for various operations will be destroyed.

SUMMARY OF THE INVENTION

Accordingly, the object of the present invention is to provide a compact portable electronic apparatus in which data can be prevented from being destroyed even when a battery is removed by mistake during operation.

In order to achieve the above object, the present invention provides a compact portable electronic apparatus comprising: means for processing information; battery means for providing drive power to the processing means; a mounting portion for removably mounting the battery means; means for releasably locking the battery means in the mounting portion; means for detecting a start of releasing operation of the locking means; and means for storing inprocess data by the processing means in response to a detection result from the detecting means.

According to the apparatus constructed in this manner, the start of the removal operation is detected by means of the detecting means when the battery pack is removed from the main frame, and the in-process data is entered into the storing means by means of the entry means during the time interval between the detection and the point of time when the electrical connection by means of the connecting means is cut off. Thus, the power supply can be cut off after the data and the like are saved, so that the data can be prevented from being destroyed even when the battery pack is carelessly removed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show a portable terminal according to an embodiment of the present invention, in which;

FIG. 1 is a perspective view showing an outline of the portable terminal;

FIG. 2 is a sectional view showing an arrangement of a battery mounting portion in a state such that a battery pack is located in a predetermined loaded position;

FIG. 3 is a sectional view showing an arrangement of the battery mounting portion in a state such that the battery pack is located in a depressed position to be removed;

FIG. 4 is a block diagram showing the general circuit configuration of the portable terminal; and FIG. 5 is a circuit diagram showing a configuration of a power-off circuit using a microswitch;

FIGS. 7 and 8 show a modification of a detecting switch, in which;

FIG. 7 is a sectional view schematically showing a battery eject button and the detecting switch; and FIG. 8 is a plan view showing part of the detecting switch.

DETAILED DESCRIPTION OF THE PREFERRED EMBODIMENT

An embodiment of the present invention applied to a portable terminal will now be described in detail with reference to the accompanying drawings.

Figure 1:
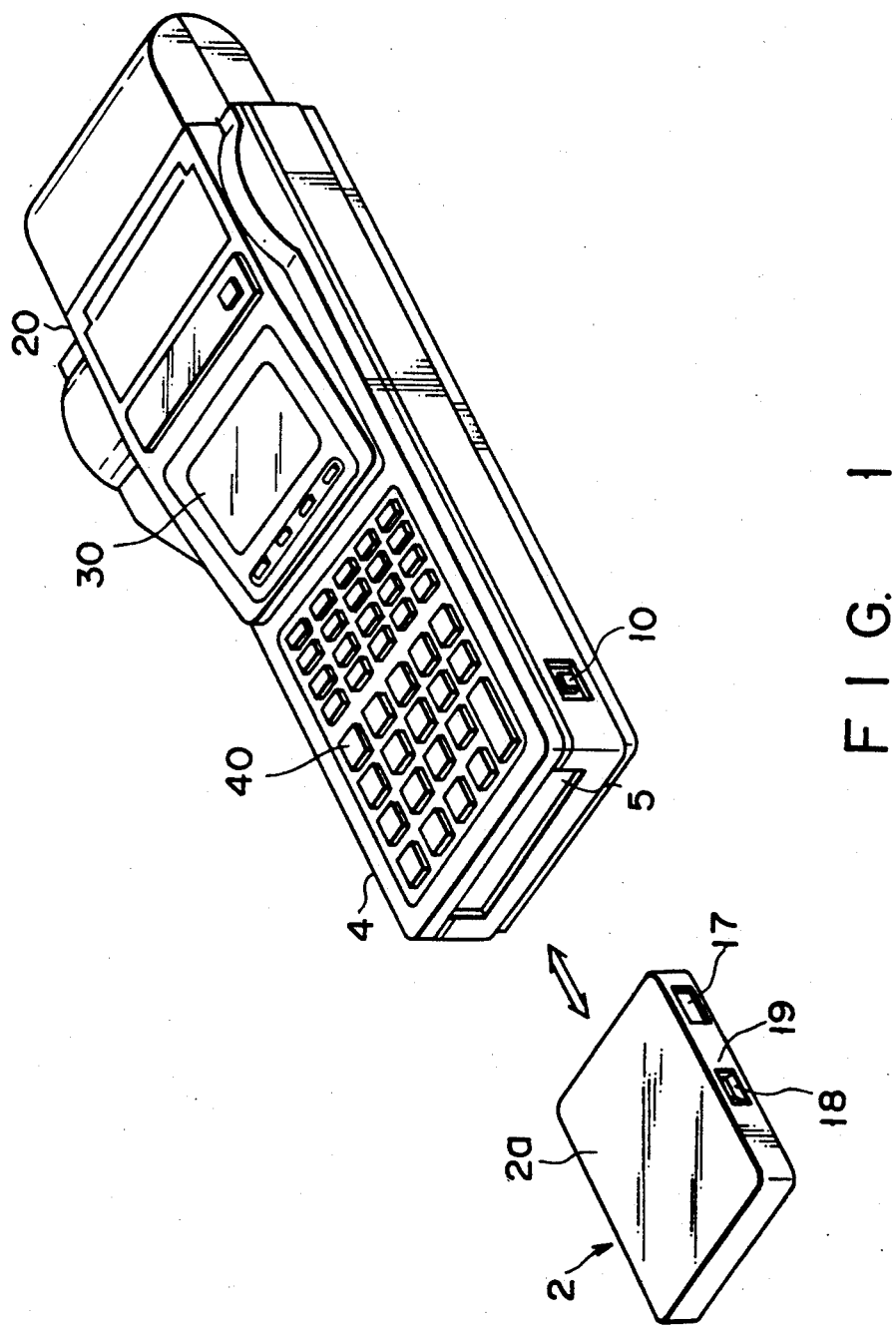

As shown in FIG. 1, the portable terminal is provided with a substantially rectangular main body 4. A thermal printer 20 is mounted on the upper portion of the body, a liquid crystal display panel (LCD) 30 for displaying various data, etc. and a keyboard 40, through which the various data and command information are input, are arranged on the lower portion of the body.

Inside the main body 4, a battery mounting portion (described later) is formed under the keyboard 40. A battery pack 2, which serves as a main power source for driving the terminal, is removably loaded into the mounting portion 3. (See, for example, FIG. 2) The battery pack 2 includes a rectangular case 2a and a chargeable Ni-Cd battery (not shown) housed in the case.

An eject button (release means) 10 for ejecting the battery pack 2 from the mounting portion 3 is provided on a side face of the lower part of the main body 4.

Figure 2:
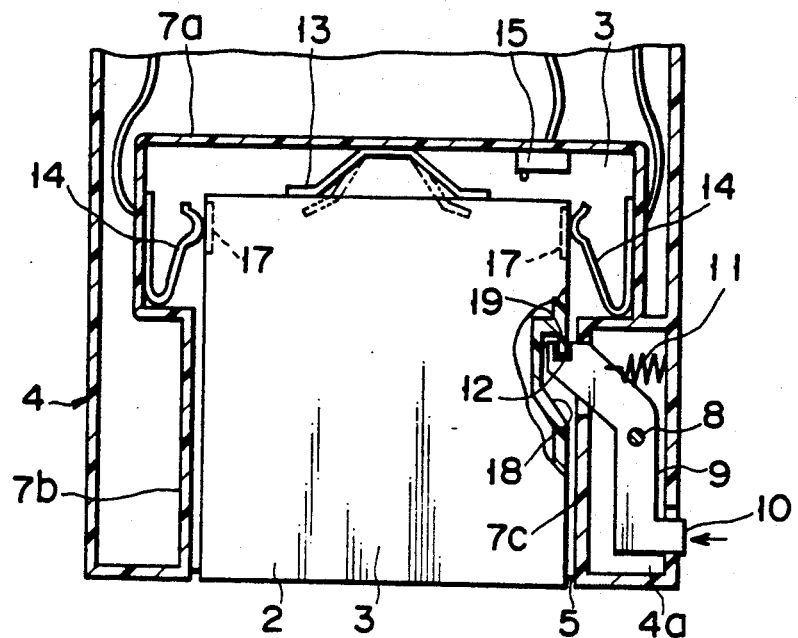
Figure 3:
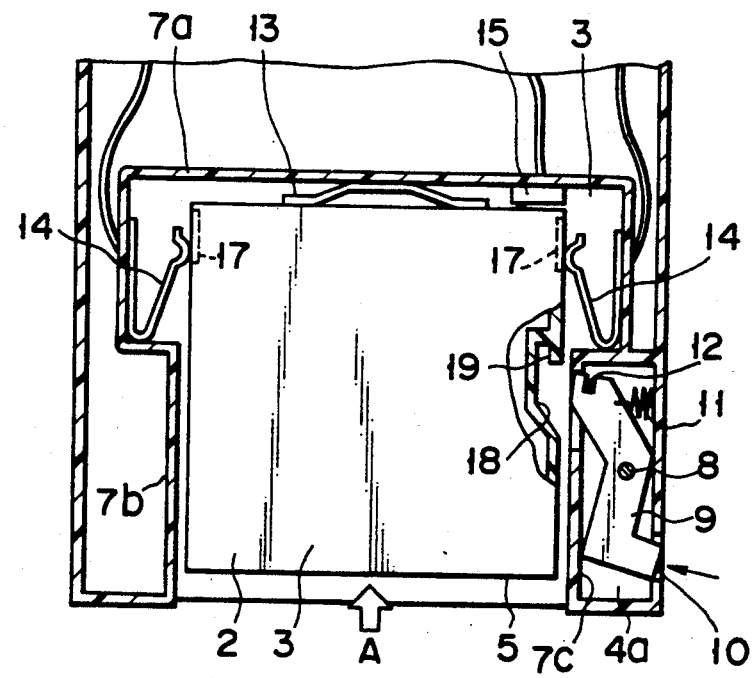

As shown in FIGS. 2 and 3, the mounting portion 3 is formed of a substantially rectangular recess defined by partition walls in the main body 4. This recess has substantially the same shape and size as those of the battery pack 2 to be set therein. More specifically, the mounting portion 3 has a loading slot 5 (see FIG. 1) opening in a side face of the body 4, and is defined by a partition wall 7a opposite to the slot 5, an opposite pair of partition walls 7b and 7c extending substantially at right angles to the wall 7a, and bottom and top walls (not shown).

A lock arm 9 for use as lock mean is provided in the main body 4. The arm 9, whose intermediate portion is supported by means of a pivot 8, is rotatable within a plane substantially parallel to the top face of the body 4. One end portion of the arm 9 is designed so that it can project into the mounting portion 3 through an opening in the partition wall 7c. Further, a recess or engaging portion 12 is formed at the one end portion of the arm 9. The other end of the arm 9 is opposed to an opening in the side wall of the main body 4, and the eject button 10 is formed on the other end of the arm 9 so as to be accessible from the outside of the body.

A compression coil spring 11 is disposed between the side wall of the main body 4 and the lock arm 9. Normally, the arm 9 is urged and held in a locked position shown in FIG. 2 by the spring 11. In the locked position, the one end portion of the arm 9 projects into the mounting portion 3, while the button 10 projects outward from the side wall of the body 4.

A leaf spring 13 is fixed to the partition wall 7a and situated in the mounting portion 3. The spring 13 has a pair of end portions which extend from the wall 7a toward the loading slot 5. A microswitch 15 is fixed to the inner surface of the partition wall 7a and situated beside the spring 13. The switch 15 serves as detecting means for detecting the start of ejecting operation when the battery pack 2 is removed from the mounting portion 3. A pair of electrode terminals 14 are fixed individually to the respective inner surfaces of the partition walls 7b and 7c so as to face each other. The terminals 14 are connected to a power line of a circuit (described later) in the main body 4.

As shown in FIGS. 1 to 3, the battery pack 2 has electrode contacts 17 attached individually to two opposite side walls of the case 2a. These contacts 17 are arranged so as to touch their corresponding electrode terminals 14 when the pack 2 is located in a predetermined position (FIG. 2) in the mounting portion 3. The contacts 17 and the terminals 14 constitute means for electrically connecting the battery pack 2 to a data processing section (described later) of the portable terminal.

A recess 18 and an engaging projection 19 are formed on the one side wall of the case 2a in a manner such that the projection 19 projects into the recess 18. The recess 18 is adapted to be situated opposite to the one end portion of the lock arm 9 when the battery pack 2 is located in the predetermined position in the mounting portion 3. In this predetermined position, moreover, the engaging projection 19 engages the engaging portion 12 of the arm 9.

FIG. 4 shows the general circuit configuration of portable terminal.

The portable terminal is provided with a data processing section 24 in addition to the thermal printer 20, the liquid crystal display panel 30, and the keyboard (K/B) 40 mentioned before. The processing section 24 including a 16-bit CPU 50 for controlling the entire operation of the terminal, an ASIC 51 constituting an execution circuit for transferring the various data and command information to and from the CPU 50, and a memory 52 of 1 M bite capacity for storing processing data and fixed data or an operation program for various operations. The processing section 24 further includes a printer controller 53 for controlling the thermal printer 20, an RS-232C interface (I/F) 54, a C-MOS I/F 55, a photocoupler I/F 56, the aforesaid battery pack 2 as the main power source, and an auxiliary battery 57 which serves as a backup power source for the memory 52.

Figure 5:
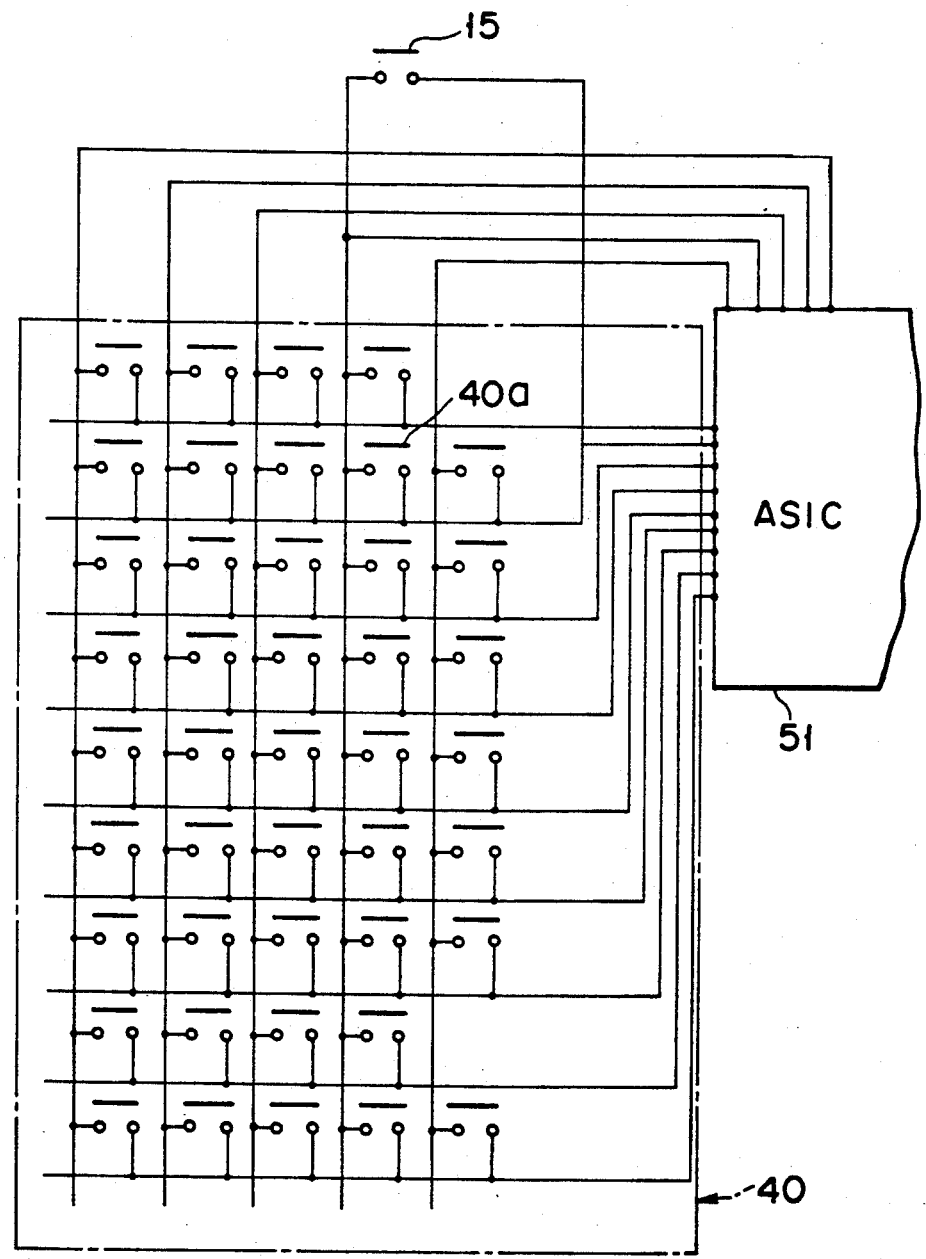

FIG. 5 shows a configuration of a power-off circuit using the microswitch 15.

Electrodes corresponding to individual input keys of the keyboard 40 are arranged in the form of a matrix to constitute a keyboard-contact matrix circuit, and the microswitch 15 is connected in parallel with contacts 40a of power-off keys of the matrix circuit. By turning on the microswitch 15, therefore, the operation mode can be adjusted to a normal termination state (stand-by state) which can be also established by operating the power-off keys on the keyboard 40. The normal termination state is state in which the CPU 50 is on stand-by for key entry after the in-process data and processes are stored into the memory 52 for reactivation.

When the microswitch 15 is turned on, therefore, the CPU 50 becomes prepared for the key entry before the electrode contacts 17 of the battery pack 2 are disengaged from the electrode terminals 14 of the mounting portion 3 so that the power supply from the battery pack is cut off.

The following is a description of the operation of the portable terminal constructed in this manner.

When the battery pack 2 is inserted into the mounting portion 3 through the loading slot 5 of the main body 4, as shown in FIGS. 1 and 2, it advances against the urging force of the spring 11 so that it pushes that end portion of the lock arm 9 on the side of the engaging portion 12 outward. When the battery pack 2 reaches the position where the recess 18 of the pack 2 faces the end portion of the arm 9, the engaging portion 12 of the arm 9 enters the recess 18. At the same time, the distal end portion of the battery pack 2 presses both end portions of the leaf spring 13, thereby subjecting them to elastic deformation.

When the force to push in the battery pack 2 is removed in this state, it is pushed back toward the loading slot 5 by the urging force of the spring 13. Thereupon, the engaging projection 19 of the battery pack 2 is fitted into the engaging portion 12 of the lock arm 9, whereby the arm 9 is prevented from rotating. Thus, the battery pack 2 is locked in the predetermined position in the battery mounting portion 3 in a manner such that it is urged toward the slot 5 by means of the spring 13, as shown in FIG. 2.

At this time, moreover, the electrode terminals 14 of the mounting portion 3 individually touch the electrode contacts 17 of the battery pack 2, whereby the pack 2 is connected electrically to the circuit of the portable terminal.

In removing the battery pack 2 from the mounting portion 3, on the other hand, the pack 2 is first pushed in the direction of arrow A to reach a depressed position, resisting the urging force of the leaf spring 13, as shown in FIG. 3. Thereupon, the engaging projection 19 of the pack 2 is disengaged from the engaging portion 12 of the lock arm 9, so that the arm 9 is allowed to rotate around the pivot 8. By depressing the eject button 10 against the urging force of the compression spring 11, in this state, the lock arm 9 is rotated to the released position of FIG. 3. More specifically, the distal end portion of the arm 9 is retreated from the recess 18 of the battery pack 2 so that the pack 2 is unlocked. In the depressed position, the contacts 17 and the terminals 14 are in conduction.

When the battery pack 2 is unlocked, it is pushed out toward the loading slot 5 by the urging force of the leaf spring 13. When the pack 2 is moved for a predetermined distance from the depressed position toward the slot 5, the electrode contacts 17 leave the electrode terminals 14, s that the electrical connection between the battery pack and the circuit of the portable terminal is cut off. Then, the battery pack 2 can be easily taken out from the mounting portion 3 by holding the end portion of the pack projecting from the slot 5 and drawing it out.

The start of the aforesaid operation for the removal of the battery pack 2 can be detected when the microswitch 15 is turned on as the pack 2 is pushed in. In response to the activation of the switch 15, the contacts 40a are automatically closed in the same manner as when the power-off keys of the keyboard 40 are depressed. Thus, the in-process data is stored into the memory 52, whereupon the operation of the portable terminal normally terminates. The electrode contacts 17 and the electrode terminals 14 are formed and arranged so that they can be kept in contact with one another for at least a period of time necessary to store the in-process data into the memory 52 after the microswitch 15 is turned on as the battery pack 2 moves from its depressed position toward the loading slot 5. Even if the battery pack 2 is misguidedly removed from the mounting portion 3 in the course of the processing operation of the portable terminal, the power-off circuit can be connected by the detection output of the microswitch 15. Accordingly, the processing operation can be normally terminated before the electrode contacts 17 of the battery pack 2 and the electrode terminals 14 of the holder portion 3 lose contact with one another. Thus, the inprocess data, problem data, etc. can be prevented from being destroyed by an instantaneous cut off of the power supply.

If a power-on key is operated by mistake when the battery pack 2 is pushed in to be removed while the power supply is off (normal termination state), moreover, the normal termination state can be maintained by connecting the power-off circuit by means of the detection output of the microswitch 15. Thus, the data and the like can never be destroyed.

When the start of the operation for the removal of the battery pack 2 is detected by the microswitch 15, as described above, the processing data is immediately saved in the same manner as when the power-off keys are depressed. After the data and the like are saved, the power supply can be cut off. Despite the use of the simple construction, therefore, the data and the like can be securely prevented from being destroyed by an instantaneous cut off of the power supply, even if the battery pack is removed in a wrong manner.

In the embodiment described above, the operation to push in the battery pack 2 is detected by the microswitch 15. Alternatively, however, the start of the removal operation for the battery pack may be detected by detecting the operation of the battery eject button 10, for example.

Figure 6:
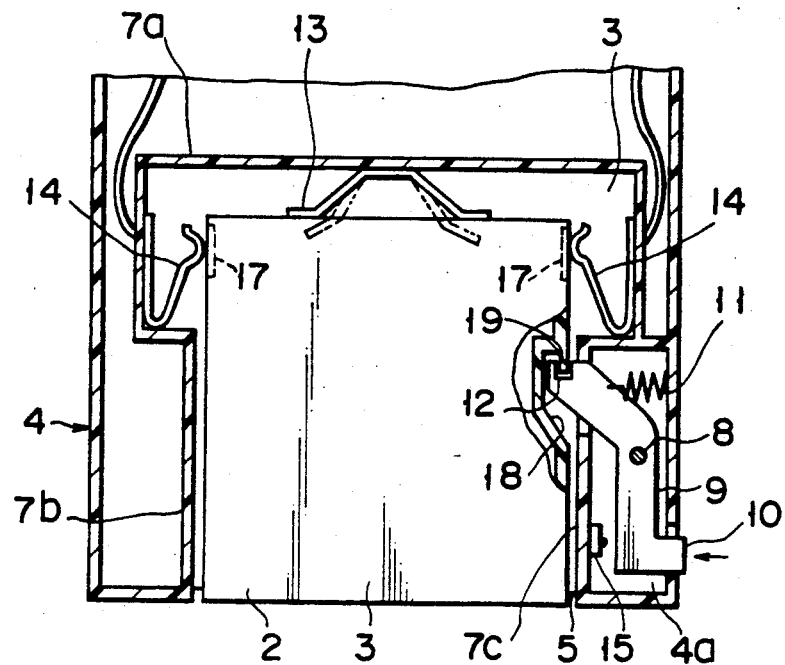
FIG. 6 is a sectional view showing an alternative embodiment of the battery mounting portion.

According to an embodiment shown in FIG. 6, a microswitch 15, which is opposed to a lock arm 9, is designed to be turned on when the arm 9 is rotated to its release position. Also in this case, the same effect of the foregoing embodiment can be obtained.

Figure 7:
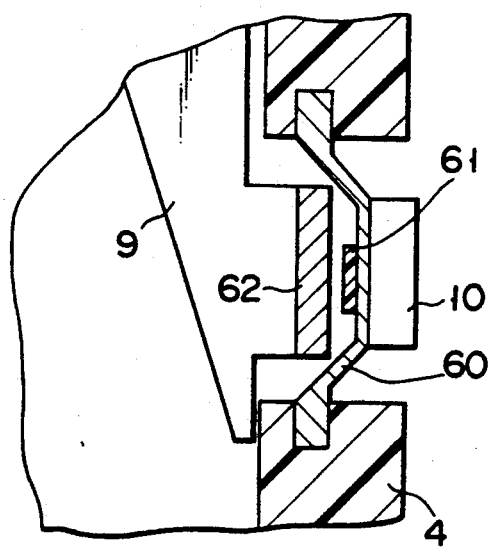

FIG. 7 shows an embodiment in which a battery eject button 10 is formed integrally with a switch for detecting the start of the removal operation for a battery pack 2.

Figure 8:
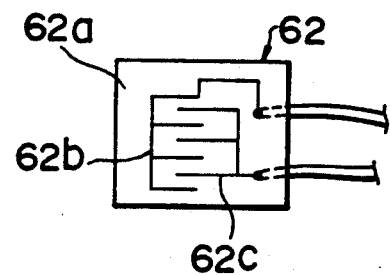

In FIG. 7, the eject button 10 is formed independently of a lock arm 9. More specifically, the button 10 is movably supported on a side wall of a main body 4 by a leaf spring 60 so as to face an end of the arm 9. A contact plate 61 made of electrically conductive rubber is provided on the back of the button 10, and a detecting switch 62 is disposed on that portion of the lock arm 9 which faces the button. In this case, the switch 62 has a substrate 62a and comb-shaped electrodes 62b and 62c alternately arranged thereon, as shown in FIG. 8. The electrodes 62b and 62c of the switch 15 are connected to the aforementioned power-off circuit (contacts 40a of the power-off keys).

According to this arrangement, when the eject button 10 is depressed in order to eject the battery pack 2 from the mounting portion 3, the contact plate 61 touches the electrodes 62b and 62c of the switch 62, thereby causing them conduct. As a result, the power-off circuit is closed, and the in-process data, problem data, etc. are immediately saved in the memory, whereupon the battery pack 2 is allowed to be removed.

In each of the embodiments described above, the battery pack 2 can be unlocked only when the lock arm 9 and the pack 2 are rocked and pushed in, respectively. Thus, the battery pack is further securely prevented from being carelessly ejected. Alternatively, however, the battery pack 2 may be designed so that it can be unlocked by only depressing the eject button 10, that is, by only rotating the lock arm 9 to its release position. Also in this case, the time interval between the start of the removal operation for the battery pack 2 and the power cut off can be set long enough to store the in-process data by adjusting the size of the contacts 17 of the battery pack and the arrangement of the contacts 17 and the electrode terminals 14. Thus, the data and the like can be prevented from being destroyed due to the removal of the battery pack, as in the cases of the foregoing embodiments.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A compact electronic apparatus comprising:
   means for processing information;
   battery means for providing drive power to the processing means;
   a mounting portion for removably storing the battery means;
   means for electrically coupling the battery means to the processing means when the battery means is in the mounting portion;
   means for causing the processing means to assume a power-off state;
   means for detecting a start of removal of the battery means from the mounting portion when the processing means is not in the power-off state and outputting a detection signal indicative thereof; and
   means for storing, in response to the detection signal, in-process data during a time interval beginning at the start of the removal of the battery means and ending when the battery means is uncoupled from the processing means.

2. An apparatus according to claim 1, wherein the mounting portion includes an outwardly opening loading aperture through which the battery means is loaded into and removed from the mounting portion, and the detecting means includes a detecting switch disposed in the mounting portion such that the detecting switch is operated by the battery means when the battery means is moved from the mounting portion.

3. An apparatus according to claim 2, further comprising:
   means, disposed in the mounting portion, for urging the battery means stored in the mounting portion toward the loading aperture; and
   means for releasably locking the battery means in the mounting portion.

4. An apparatus according to claim 1, further comprising means for releasably locking the battery means in the mounting portion, the locking means including a lock member movable between a lock position wherein the lock member engages the battery means in the mounting portion and a release position wherein the lock member disengages from the battery means; and
   the detecting means comprises a detecting switch disposed in a position such that the detecting switch is operated by the lock member when the lock member is moved to the release position.

5. An apparatus according to claim 4, wherein the lock means includes a press portion for moving the lock member to the release position, the press portion being accessible from outside the compact portable electronic apparatus.

6. An apparatus according to claim 1, further comprising means for releasably locking the battery means in the mounting portion, the locking means comprising:
   a lock member movable between a lock position where the lock member engages the battery means in the mounting portion and a release position where the lock member disengages from the battery means; and
   a release member for moving the lock member to the release position, the release member being disposed proximate to the lock member and accessible from outside of the compact portable electronic apparatus; and
   the detecting means comprises a detecting switch disposed between the lock member and the release member.

7. An apparatus according to claim 1, further comprising auxiliary battery means for supplying backup power to the storing means when the drive power provided by the battery means is terminated.

8. A portable electronic apparatus comprising:
   means for processing information;
   battery means for supplying electric power to the processing means;
   means for removably receiving the battery means;
   means for electrically coupling the battery means to the processing means when the battery means is received in the receiving means;
   means for detecting a start of removal of the battery means from the receiving means and outputting a detection signal indicative thereof; and
   means for storing, in response to the detection signal, in-process data during a time interval beginning at the start of the removal of the battery means and ending when the electrical coupling by the coupling means is terminated due to the removal of the battery means.

9. An apparatus according to claim 8, wherein the detecting means includes a detecting switch disposed in the receiving means for detecting the start of the removal of the battery means.

10. An apparatus according to claim 9, wherein the receiving means includes a mounting portion having an outwardly opening loading aperture through which the battery means is loaded into and removed from the mounting portion, and the detecting switch is disposed in a position to be operated by the battery means when the battery means is moved from the mounting portion.

11. An apparatus according to claim 8, further comprising means for releasably locking the battery means in the receiving means, and wherein the detecting means includes a detecting switch for detecting a predetermined movement of the locking means.

12. An apparatus according to claim 11, wherein the locking means includes a lock member movable between a lock position wherein the lock member engages the battery means in the receiving means and a release position wherein the lock member disengages from the battery means; and
   the detecting switch is operated by the lock member when the lock member is moved to the release position.

13. An apparatus according to claim 8, wherein the receiving means comprises:
   a mounting portion having an outwardly opening loading aperture through which the battery means is loaded into and removed from the mounting portion;
   a first conducting portion disposed at the battery means; and
   a second conducting portion disposed at the mounting portion for contacting with the first conducting portion, the first and second conducting portions contacting each other for predetermined period of time when the battery means moves from the mounting portion toward the loading aperture.

14. An apparatus according to claim 13, wherein the predetermined period of time is longer than a time required for the entry of the in-process data into the storing means.

15. An apparatus according to claim 8, further comprising:
   a first conducting member disposed at the battery means; and
   a second conducting member disposed at the receiving means for contacting with the first conducting portion, the first and second conducting member contacting each other when the battery means is in the receiving means and when the battery means is at a predetermined distance from the receiving means.

16. A compact portable electronic apparatus comprising:
   means for processing information;
   battery means for supplying electric power to the processing means;
   a mounting portion for removably mounting the battery means, the mounting portion including an outwardly opening aperture through which the battery means is loaded into and removed from the mounting portion;
   means for electrically coupling the battery means to the processing means when the battery mean sis loaded in the mounting portion, the coupling means comprising:
a first conducting portion provided at the battery means; and
a second conducting portion provided at the mounting portion, the first and second conducting portions contacting each other for a predetermined period of time when the battery means moves from the mounting portion toward the aperture;
means for detecting a start of removal of the battery means from the mounting portion and providing a detection signal indicative thereof; and
means for storing in-process data during the predetermined period of time in response to the detection signal.

* * * * *